Figure 1:
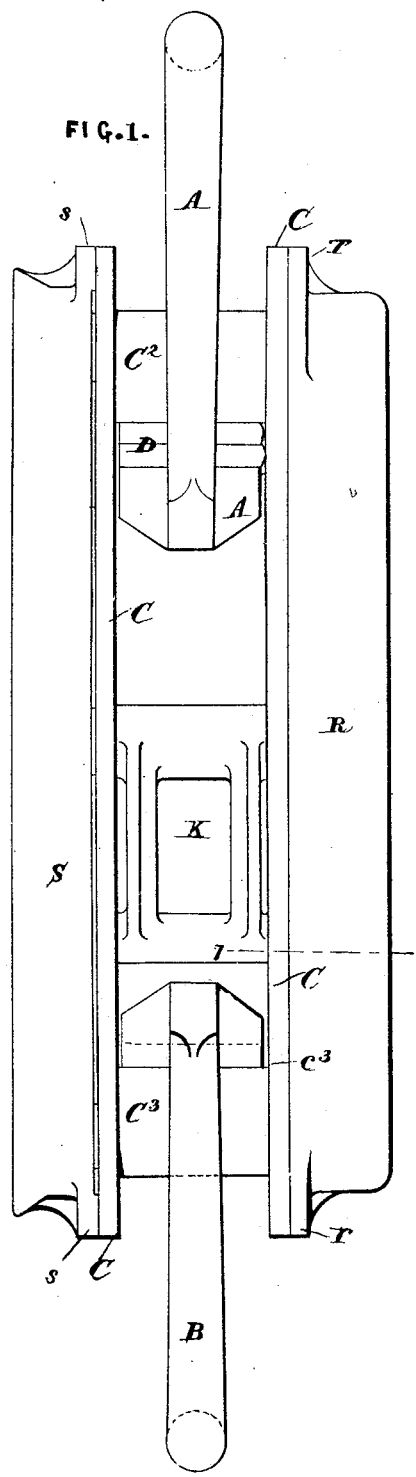

(No Model.) 5 Sheets—Sheet 1.

T. H. WARD.
MACHINERY OR APPARATUS FOR ASCERTAINING AND INDICATING WEIGHT

No. 270,864. Patented Jan. 16, 1883.

Witnesses
Hamilton D. Turner.
James F. Tobin

Inventor
Thomas H. Ward
by his Attorneys
Howson and Son (No Model.) 5 Sheets—Sheet 2.
T. H. WARD.
MACHINERY OR APPARATUS FOR ASCERTAINING AND INDICATING WEIGHT.
No. 270,864. Patented Jan. 16, 1883.
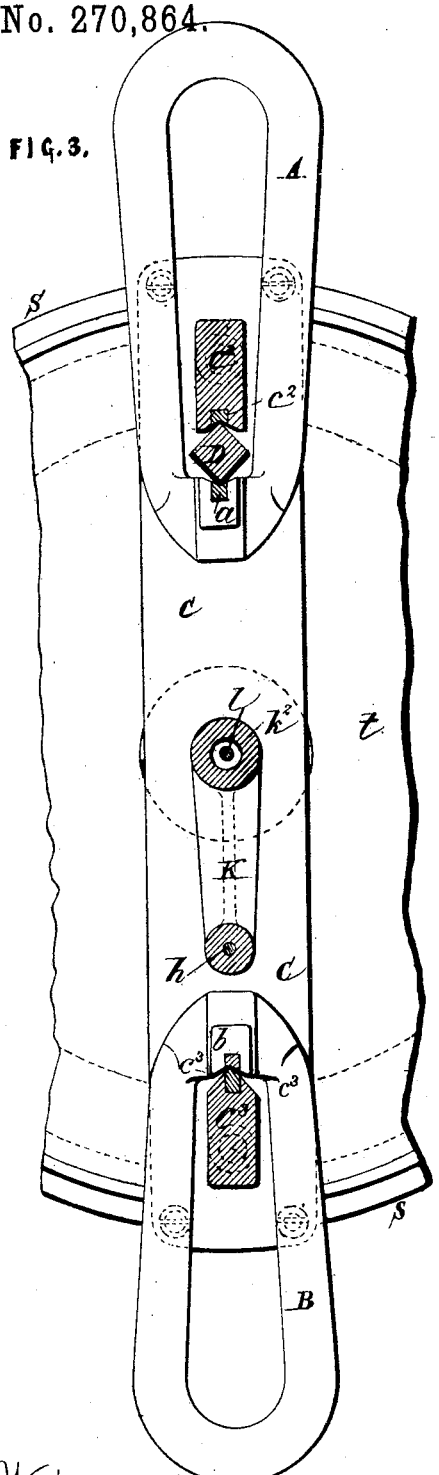
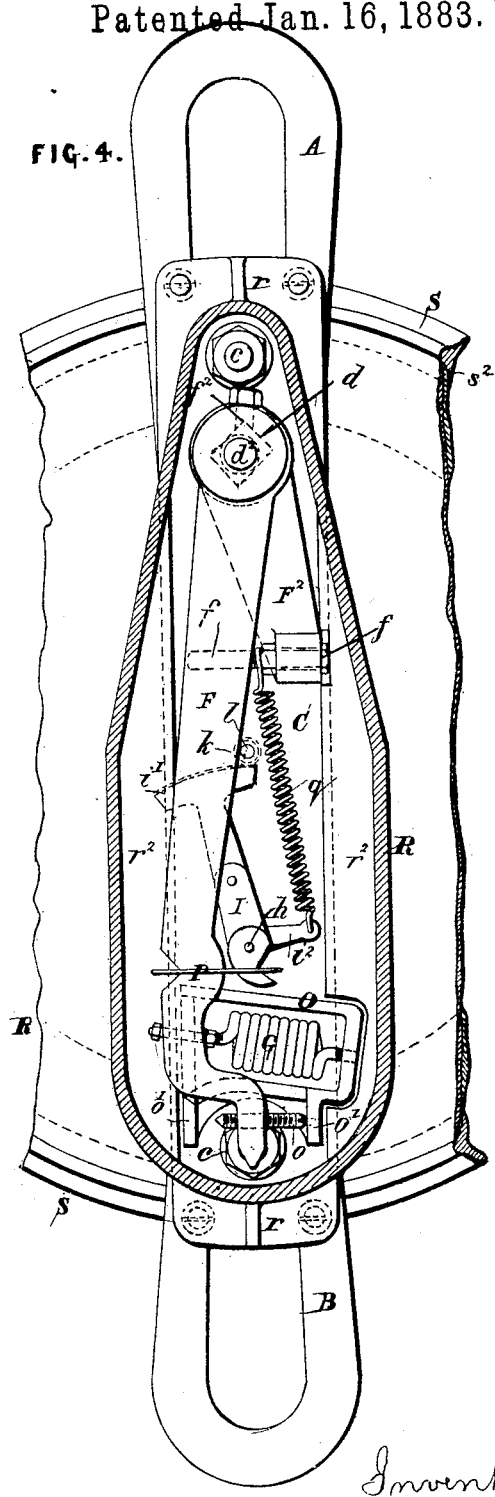
Witnesses
Hamilton D. Turner
James T. Tobin
Inventor
Thomas H. Ward
by his Attorneys
Howson and Son (No Model.)  5 Sheets—Sheet 3.

T. H. WARD.
MACHINERY OR APPARATUS FOR ASCERTAINING AND INDICATING WEIGHT.

No. 270,864.  Patented Jan. 16, 1883.

Witnesses
Hamilton D. Turner
James F. Tobin

Inventor
Thomas H Ward
by his Attorneys
Howson and Son

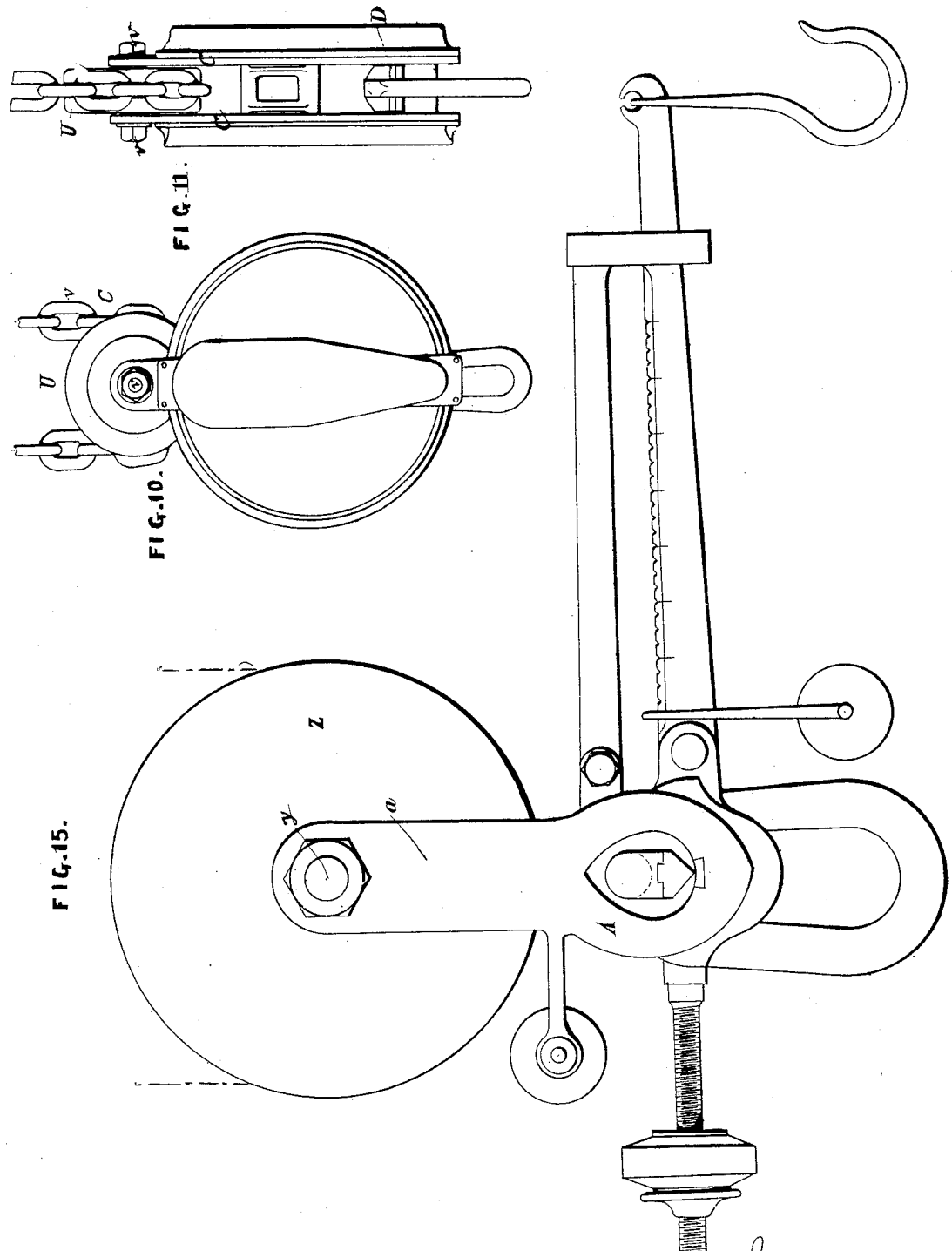

(No Model.) 5 Sheets—Sheet 5.

T. H. WARD.
MACHINERY OR APPARATUS FOR ASCERTAINING AND INDICATING WEIGHT.

No. 270,864. Patented Jan. 16, 1883.

Witnesses,
Hamilton D. Turner
James J. Tobin

Inventor
Thomas H. Ward
by his Attorneys
Howson and Son

UNITED STATES PATENT OFFICE.

THOMAS H. WARD, OF TIPTON, COUNTY OF STAFFORD, ENGLAND.

MACHINERY OR APPARATUS FOR ASCERTAINING AND INDICATING WEIGHT.

SPECIFICATION forming part of Letters Patent No. 270,864, dated January 16, 1883.

Application filed April 1, 1882. (No model.) Patented in England August 17, 1881, No. 3,581.

*To all whom it may concern:*

Be it known that I, THOMAS HENRY WARD, (of the firm of Howl, Ward & Howl,) a subject of the Queen of Great Britain, and residing at Tipton, in the county of Stafford, England, have invented certain Improvements in Machinery or Apparatus for Ascertaining and Indicating Weight, (for which I have obtained a patent in Great Britain, No. 3,581, dated August 17, 1881,) of which the following is a specification.

My invention relates to improvements in the machinery or apparatus for ascertaining and indicating weight, in respect of which former Letters Patent were granted to me dated the 24th of September, 1878, No. 208,444.

In carrying out my present invention, in lieu of having the loaded frame—that is to say, the shackles, body, and bottom hook—secured together with heavy hook-joints at the bearing, as described in the specification to my said former Letters Patent, I reduce the weights and cost and secure a very much simpler and safer frame by employing two side links or plates secured together by means of a cross-head carrying its knife-edges or bearings therefor at top and bottom, threaded through the top and bottom shackles or hooks. In lieu, also, of having a box fixed to the body, in order to secure all the working parts inside, and then combining a lid with the same, as described in my said former specification, I dispense with the box altogether by securing all working parts to one of the side links or plates and merely provide a lid, thus reducing the weight, work, and cost of manufacture. According to a modification, the working parts may be inclosed between the two side links or plates, thereby admitting of the use of two dials, (one at the front and the other at the back.) In this case the working parts, including the tumbler or rocker, may be duplicated, so as to produce two independent measuring apparatus, each of which will form a check upon the other. In order to adjust the angularity or degree of deviation from the vertical line of the rocker, I key this rocker first to a small lever, securing and adjusting the angle of the same to the larger or main lever by a set-screw. Instead, also, of employing a heavy dish-dial, which would require turning, as in the arrangement described in my said former specification, I cast the rim separate, and secure it to the body of the machine, after having let in from behind a light sheet or plate as a back, with or without a separate graduated plate between, thus securing a light, yet strong and cheap, dial, having all the advantages of a dish to protect the needle, and also to protect the dial, from being bent, and also avoiding the necessity of turning and polishing the dial all over. In place of having a right-and-left-hand screw and corresponding nuts let into the quadrantal rack and the main lever, in order to secure them together, as in my said former arrangement, I use a plate or thin sheet of metal with bearings cut into it, so that without screws, pins, nuts, or any other device it is a perfect connection having the extra advantage of a knife-edge bearing, all backlash being taken out of the joint by counterweighting or counterspringing the quadrantal rack itself, thus reducing the cost and rendering the machine more certain in action. Instead of securing the lever-shape body which carries the bearings for the pinion-shaft and quadrantal rack fulcrum-pin, as in my said former arrangement, I fix it between the two side links or plates, whereby economy in construction is effected.

I further propose to invert the machine as described—that is to say, place the tumbler or rocker in the bottom link instead of in the top, and pin the bottom sheave of an ordinary crane-chain or of a pulley-block—Weston's block, for example—in between the two side frames, thereby combining a lifting-gear with a weighing-machine.

I also propose to combine the improvements hereinbefore described with weighing machines or apparatus of other constructions than that hereinbefore referred to.

In order that my said invention may be fully understood, I shall now proceed more particularly to describe the same, and for that purpose shall refer to the several figures on the annexed sheets of drawings, the same letters of reference indicating corresponding parts in all the figures.

Figure 2:
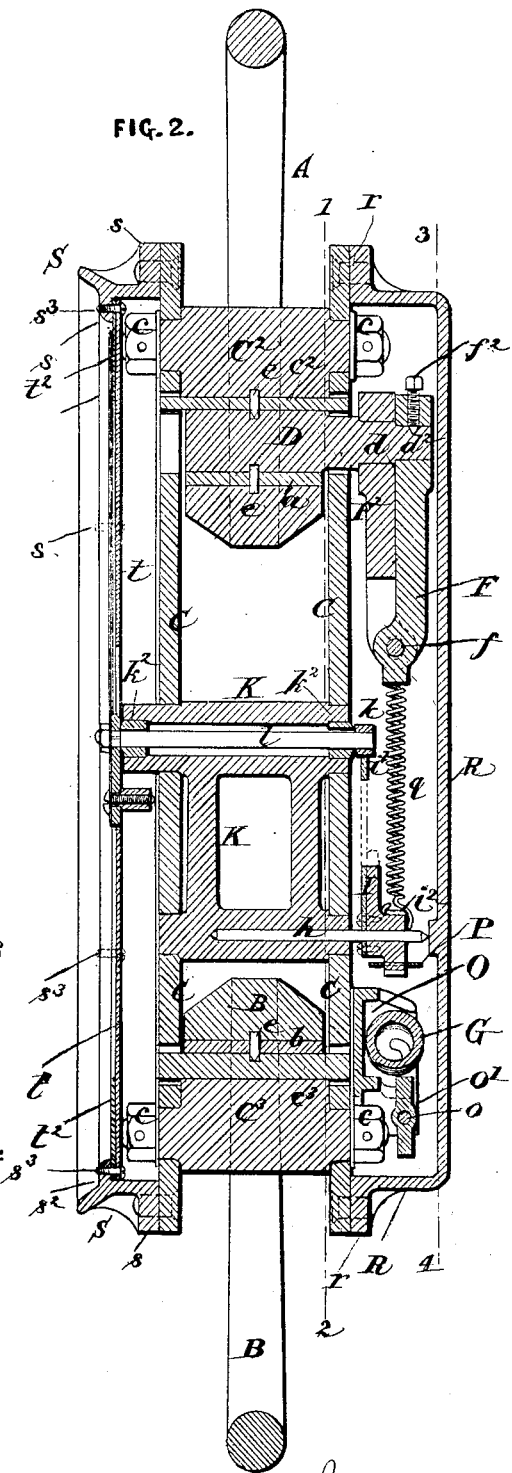

Figure 1 of the accompanying drawings represents in side elevation and Fig. 2 in transverse section an apparatus with which are combined improvements according to my present invention. Fig. 3 is a section on the line 1 2, Fig. 2, and Fig. 4 is a section on the line 3 4, Fig. 2, parts of the dial being broken away in the said Figs. 3 and 4. Figs. 5 to 9 are details thereof, and Figs. 10 to 15 are modifications and adaptations, as hereinafter described.

Referring to Figs. 1 to 9, two side links or plates, C, are secured together by means of the cross-heads or distance-pieces $C^2$ and $C^3$, the ends of which project through the said plates and receive screw-nuts $c$, to secure them in position. These distance-pieces $C^2$ and $C^3$ are respectively threaded through the top and bottom shackle loops or hooks A and B. The lower distance-piece, $C^3$, carries a strip, $c^3$, with a knife-edge, and the shackle B carries a similar strip, $b$, with a corresponding bearing formed therein, to which the said knife-edge is adapted, as shown in Fig. 3. Between the upper cross-head or distance-piece, $C^2$, and the bottom part of the shackle A is situated the rocker D, having upper and lower knife-edges adapted to corresponding bearings in strips $c^2$ and $a$, carried by the cross head $C^2$ and shackle A, respectively. The normal position of this rocker is such that a line drawn through its knife-edges will be at a slight angle in respect to a line drawn through the centers of the shackles, as described in my former patent. To maintain the central position of the parts, and at the same time avoid rubbing surfaces, a pin, $e$, is let into each female knife-edge, and its end projecting from the said edge is beveled and enters a recess or cross-cut slot in the corresponding male knife-edge, as is shown clearly in the enlarged longitudinal section and end view of two engaging knife-edges in Figs. 5 and 6. The pin may be in the male and the recess in the female knife-edge, if preferred. One end of the rocker D extends through one of the side plates, C. This end carries one end of the lever-arm F, by which the movement of the rocker D is communicated to the indicator. The adjustment of the rocker D to its proper normal angularity is effected by means of the small lever $F^2$, fixed at one end upon the part $d$ of the projecting end of the rocker D, the said lever $F^2$ carrying at its other end a screw, $f$, screwed into the lever F, to connect the said levers F and $F^2$ together. By this screw $f$ the relative position of the levers F and $F^2$, and consequently the angularity of the rocker D, can be adjusted, and when the adjustment is effected the screw $f^2$ is tightened up to secure the lever F to the end of the rocker D. The movement of the lever F is resisted by a spring, G, as described in my said former specification, and is provided with an adjustable stop-screw, $o$, to limit the movement of the lever F in either direction by coming against stops $o'$, formed on a piece, O, attached to or cast on the plate C, this piece O also affording an anchorage for the spring G.

Figure 7:
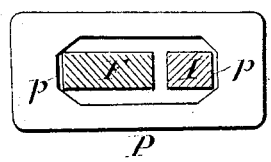
Figure 8:
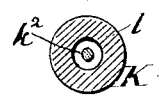

The lever F is connected to the tail of a lever, I, turning on a pin, $h$, and carrying at its other end a toothed quadrantal rack or segment, $i'$, gearing with a pinion, $k$, on a shaft, $l$, to which the index-finger L of the indicating-dial is affixed, these parts being analogous to those described in the specification of my aforesaid former patent. The connection of the lever F to the lever I is, however, effected by the plate P, with a slot in it, in which the said levers engage, they being formed with recessed parts, which bear against knife-edges $p$ $p$ (of the width of the bearing parts of the levers) at the opposite ends of the said slot in the plate. Fig. 7 is a plan of this plate, with the levers in section, this figure being drawn to an enlarged scale. A spring, $q$, is attached at one end to the projection $i^2$ from the lever I, and at its other end to the screw $f$ or any other suitable part of the machine, which spring prevents backlash of the rack $i'$. The shaft $l$ and the center-pin $h$ are both carried in the same fulcrum-body K, which is situated between and fixed into the side plates, C, as shown clearly in Fig. 2. The holes or bearings for the shaft $l$ may be bored through the said body or through bearing-pieces $k^2$, let into the upper part of the said body, the holes or bearing for the pinion end of the said shaft being made an exact fit sidewise for the said shaft, but slightly oblong, with the longer axis in a vertical direction, as shown in Fig. 8, which is a section of a part of the piece K, taken on the line 1 2, Fig. 2. This lengthening of the bearing vertically allows the pinion end of the shaft $l$ to rise or fall sufficiently to compensate for any irregularity of adjustment or working between the rack $i'$ and pinion $k$.

Figure 9:
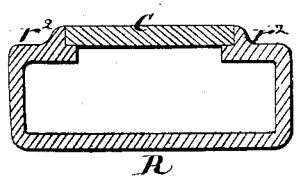

It will be seen that all the working parts which operate the indicating apparatus are so secured to or connected with one of the side plates or links, C, and that therefore the box for these parts, described in my aforesaid former specification, is rendered unnecessary, the said parts being in this present machine protected by a lid or cover, R, formed with wing-pieces or flanges $r$, by which it is secured to the said side plate or link. Fig. 9 is a transverse section on the line 7 8, Fig. 1, showing the turned-over parts $r^2$ (seen also in Fig. 4) of the said lid R, which parts $r^2$ are fitted along and engage with the sides of the plate C, as shown, to form a complete protecting-cover for the working parts inclosed thereby.

The dial is constructed as follows: A cast rim, S, of a ring form is fastened to the plate C opposite that which carries the operating mechanism, it having wing-pieces or flanges $s$ at top and bottom for this purpose, and a projecting front part to protect the finger of the dial. It has also a flanged inner part, $s^2$, so that a light sheet-metal disk, $t$, can be let into the rim from behind and secured by screws $s^3$ or otherwise to the said flanged inner part, $s^2$, as shown. The disk $t$ may itself bear the graduations; or an annular plate or ring-like piece, $t^2$, may intervene between the flanged part $s^2$ and the said disk $t$ to carry the said graduations, so as to avoid the necessity for polishing the said backing $t$. In this case the annular plate $t^2$ may be of brass and the disk $t$ of sheet-iron.

In the apparatus hereinbefore described the arrangement of the side plates, C, and cross-heads $C^2$ $C^3$, threaded through the shackles or hooks A B, gives the advantage of knife-edges of long and continuous bearing.

Figs. 10 and 11 are views at right angles to each other of the hereinbefore-described apparatus combined with the bottom sheave, U, of a crane-chain or of a pulley-block—for instance, the sheave of a Weston pulley-block—whereby the combined advantages of lifting-gear and weighing-machines are obtained. The weighing apparatus is inverted—that is to say, the tumbler or rocker D is between the bottom cross-head and link instead of between the upper ones, as before—and in place of the other cross-head and link the plates C are continued, and the bottom sheave, U, is connected thereto by the pin $v$, forming the axis of the said sheave.

Figure 12:
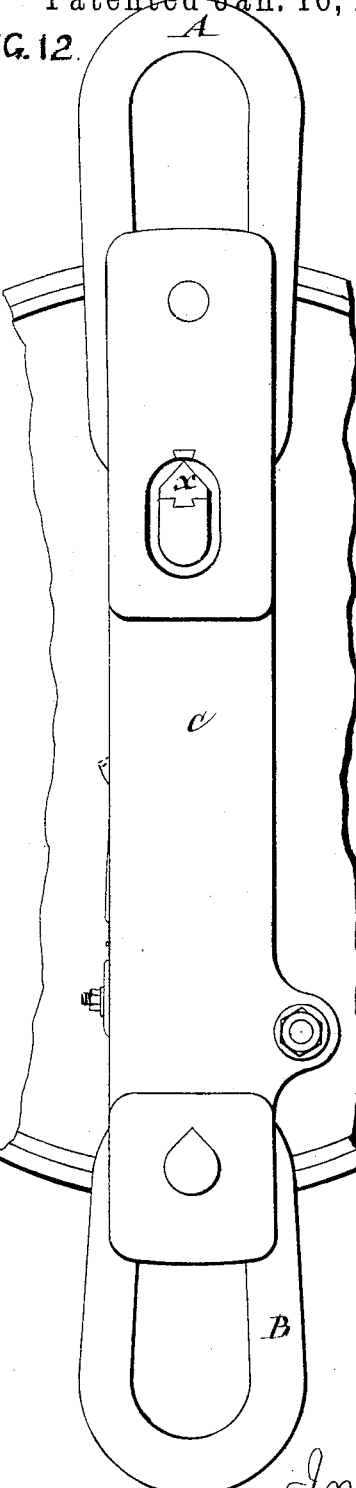
Figure 5:
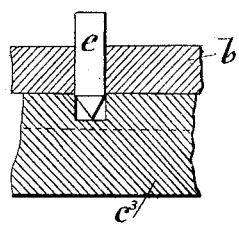
Figure 6:
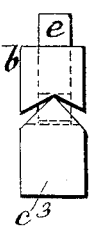
Figure 13:
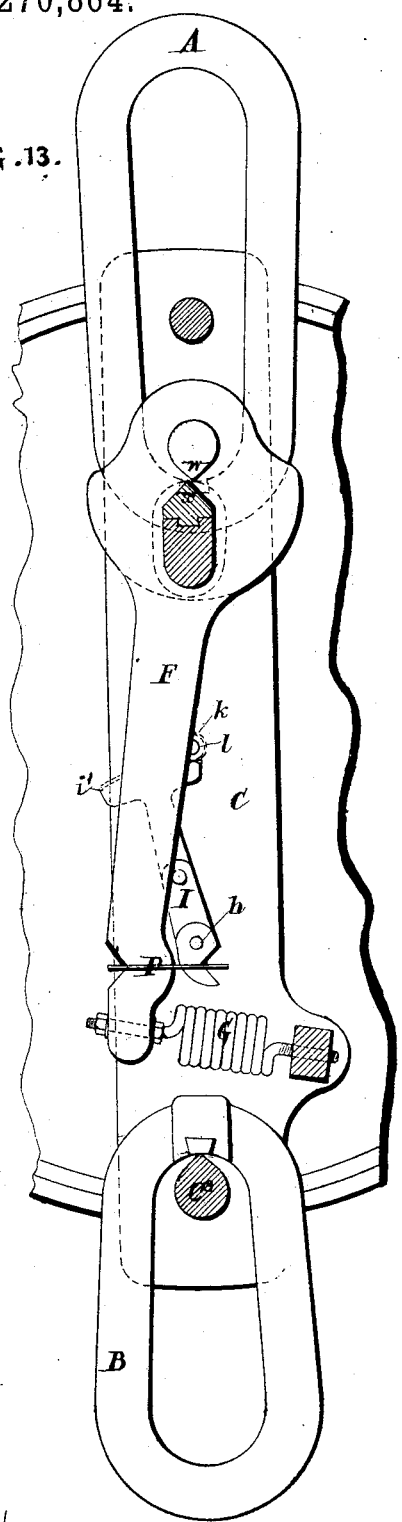
Figure 14:
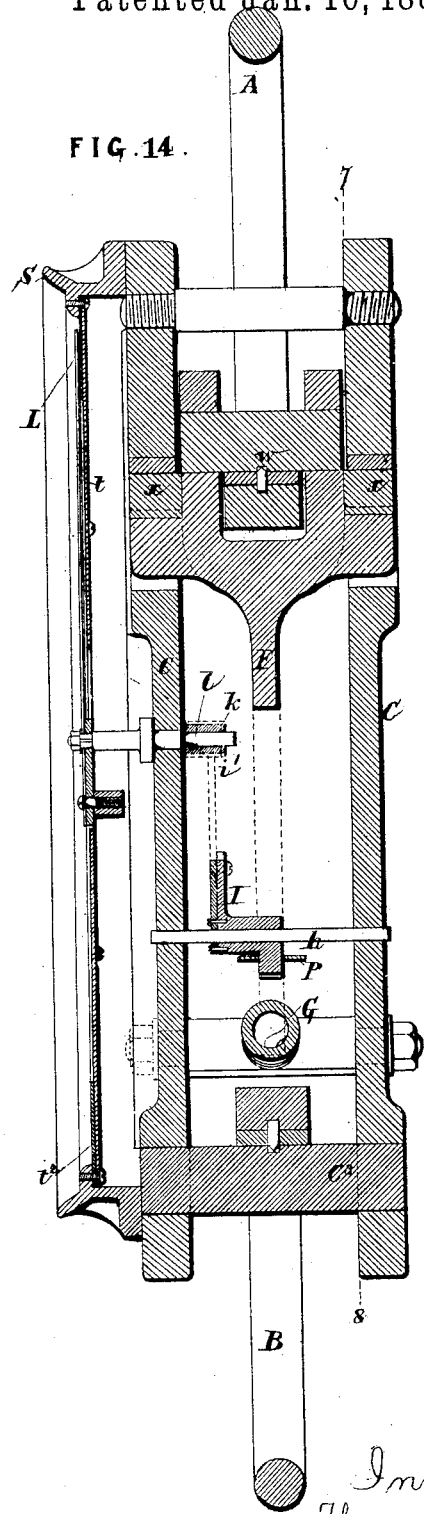

Fig. 12 is an elevation; and Figs. 13 and 14 are sections taken at right angles to each other, the former on the line 7 8 of Fig. 14, showing certain of my improvements as applied to a weighing-machine of another construction from that hereinbefore referred to, and also showing the mechanism for conveying motion to the dial-finger as arranged between the plates C. The knife-edges $w$ $x$ are arranged relatively to each other essentially as is the case in what are known as "Thomson weighing-machines," as described in the specification of Thomson's British Patent No. 728, A. D. 1876, and therefore to this arrangement I lay no claim. The said knife-edges are carried by the lever F, the corresponding bearings being in the side plates, C, and top shackle, A, respectively, the bearing of the bottom shackle, B, engaging with the corresponding knife-edge on the cross-head or distance-piece $C^3$. The lever F acts, through mechanism essentially similar to that described with regard to Figs. 1 to 4, upon the indicating-finger of the dial, which dial, as here shown, is of the same construction as described with regard to the said figures. I have marked in Figs. 12, 13, and 14 the parts which correspond to like parts in Figs. 1 to 4 with the same letters of reference, so that they will thereby be readily understood, and therefore call for no further description. The mechanism may be covered by lids at each side extending from the one plate C to the other.

Fig. 15 represents a machine constructed upon the principle of that known as a "Thomson steelyard weighing-machine," and described in the aforesaid specification of Patent No. 728 of 1876; but in this arrangement the parts of the machine are inverted, still arranging, of course, the fulcrum between the load and the counter-weight, and the side links or frames, A, are formed with continuations $a$ for receiving a pin, $y$, constituting the axis of the lower sheave, Z, of a lifting crane or block, whereby the advantages of a lifting apparatus and a steelyard weighing apparatus are combined.

Having now described and particularly ascertained the nature of the said invention and the manner in which the same is or may be used or carried into effect, I would observe, in conclusion, that I do not in all cases limit myself to the precise details hereinbefore described, and illustrated in the accompanying drawings, as the same may in some cases, it will be evident, be varied without departing from the nature of my invention. For example, the mechanism may be brought in between the side plates; or two dials may be used at front and back, either with a single or with two rockers acting independently upon independent mechanism for each dial. Nor do I limit myself in all cases to the application of my improvements to machines of precisely the construction shown, as it will be evident that some of them may with advantage be applied to machines of other analogous constructions, to which the same are or may be applicable; but

What I consider to be novel and original, and therefore claim as the invention secured to me, is—

1. The combination of hooks or shackles and rocker D, connected to the indicating devices, with links C and cross-heads connecting said links, the shackles, rocker, and cross-heads being provided with knife-edges and bearings therefor, substantially as described.

2. The combination of hooks or shackles, rocker, and indicating devices with links C, secured together, and a flanged cover, R, secured to one of said links to inclose the working parts.

3. The combination of the hooks or shackles, rocker, and lever F of a weighing apparatus, with an adjusting-lever, $F^2$, for adjusting the inclination of said rocker with reference to a vertical line through the shackles or hooks.

4. The combination of the links C and operating-lever of a weighing apparatus with the fulcrum-body K, carrying the axes of said index-finger and operating-lever, substantially as described.

In testimony whereof I have signed my name to this specification in the presence of two subscribing witnesses.

T. H. WARD.

Witnesses:
J. FRANCIS BRAME,
   *Vice-Consul U. S. A., Birm.*
JOHN M. DICKINSON,
   *U. S. Consulate, Birmingham.*